(12) United States Patent
Abadi et al.

(10) Patent No.: US 10,331,909 B2
(45) Date of Patent: Jun. 25, 2019

(54) DYNAMIC DATA FLOW ANALYSIS FOR DYNAMIC LANGUAGES PROGRAMS

(71) Applicant: International Business Machines Corporation, Armonk, NY (US)

(72) Inventors: Aharon Abadi, Petach Tikva (IL); Alexander Dvinsky, Haifa (IL); Nili Ifergan-Guy, Haifa (IL); Konstantin Shagin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 15/006,137

(22) Filed: Jan. 26, 2016

(65) Prior Publication Data

US 2017/0213049 A1    Jul. 27, 2017

(51) Int. Cl.
*G06F 21/62* (2013.01)

(52) U.S. Cl.
CPC ...... *G06F 21/6281* (2013.01); *G06F 21/6245* (2013.01)

(58) Field of Classification Search
CPC ...... G06F 21/60; G06F 21/62; G06F 21/6218; G06F 21/6281; G06F 21/629; G06F 21/6245
See application file for complete search history.

(56) References Cited

U.S. PATENT DOCUMENTS

| | | | |
|---|---|---|---|
| 6,487,665 B1* | 11/2002 | Andrews | G06F 9/468 709/229 |
| 8,793,665 B2 | 7/2014 | Murthy | |
| 8,893,280 B2 | 11/2014 | Jung et al. | |
| 9,104,528 B2 | 8/2015 | Xiao et al. | |
| 2006/0031226 A1* | 2/2006 | Cope | G06F 8/61 |
| 2006/0200664 A1* | 9/2006 | Whitehead | G06F 21/6209 713/165 |
| 2007/0106754 A1* | 5/2007 | Moore | G06F 17/3089 709/217 |

(Continued)

OTHER PUBLICATIONS

"JavaScript String Object" Article dated Jan. 2, 2010 as verified by Internet Archive (2 pages) http://web.archive.org/web/20100102155702/ https://www.w3schools.com/jsref/jsref_obj_string.asp.*

(Continued)

*Primary Examiner* — Joseph P Hirl
*Assistant Examiner* — Thomas A Gyorfi
(74) *Attorney, Agent, or Firm* — G.E Eherlich

(57) ABSTRACT

A computer implemented method of dynamically analyzing a data flow of a dynamic language program to determine access rights to data items, comprising:
1) Executing a dynamic language program.
2) During the execution, each of a plurality of data items is stored in a data wrapper that further contains a metadata record indicative of one or more characteristics of a respective data item.
3) Receiving a request from a process of the dynamic language program to access one or more requested data items of the plurality of data items.
4) Determining whether the process is allowed to access the one or more requested data item according to an analysis of a classification of the process compared to the one or more characteristics indicated by the metadata record associated with each of the one or more requested data items.
5) Generating a response to the process according to the determination.

15 Claims, 2 Drawing Sheets

(56) References Cited

U.S. PATENT DOCUMENTS

| | | | | |
|---|---|---|---|---|
| 2008/0114993 A1* | 5/2008 | Shankar | ............. | G06F 21/6209 |
| | | | | 713/193 |
| 2008/0215675 A1* | 9/2008 | Kaminitz | .......... | G06F 17/30861 |
| | | | | 709/203 |
| 2012/0143817 A1* | 6/2012 | Prabaker | ........... | G06F 17/30165 |
| | | | | 707/608 |
| 2013/0091487 A1 | 4/2013 | Chandra et al. | | |
| 2013/0212707 A1* | 8/2013 | Donahue | ............. | G06F 21/6218 |
| | | | | 726/29 |
| 2014/0282464 A1* | 9/2014 | El-Gillani | ................. | G06F 8/61 |
| | | | | 717/168 |
| 2015/0193623 A1 | 7/2015 | Pistoia et al. | | |
| 2015/0242648 A1* | 8/2015 | Lemmey | ............. | G06F 21/6218 |
| | | | | 726/30 |
| 2016/0034276 A1* | 2/2016 | Webb | ....................... | G06F 8/76 |
| | | | | 726/2 |

OTHER PUBLICATIONS

Daniel Hedin et al., "Value-sensitive Hybrid Information Flow Control for a JavaScript-like Language", Computer Security Foundations Symposium (CSF), 2015 IEEE 28th Date of Conference: Jul. 13-17, 2015, pp. 351-365.

Shiyi Wei and Barbara G. Ryder., "State-Sensitive Points-to Analysis for the Dynamic Behavior of JavaScript Objects", ECOOP 2014—Object-Oriented Programming vol. 8586 of the series Lecture Notes in Computer Science pp. 1-26.

* cited by examiner

DYNAMIC DATA FLOW ANALYSIS FOR DYNAMIC LANGUAGES PROGRAMS

BACKGROUND

The present invention, in some embodiments thereof, relates to dynamically analyzing a data flow of a dynamic language program to determine access rights to data items, and, more specifically, but not exclusively, to dynamically analyzing a data flow of a dynamic language program to determine access rights to data items to address data security aspects.

Data and/or information may be a fundamental aspect for many systems, platforms and/or organizations and preventing misuse and/or distribution of data is crucial. Therefore handling data and more specifically protecting data from leaking to undesired parties is a major concern especially as information systems are rapidly evolving, in particular distributed data systems, for example, cloud services.

Growing numbers of organizations are transitioning to become cloud oriented increasing the complexity and susceptibility of the data/information as multiple processes and/or services may request access to the various data/information sources within the organization. The processes and/or services may transfer and/or distribute the data/information outside the boundaries of the organization and/or to unauthorized parties and may thus compromise the data/information. Moreover, organizational and/or governmental regulations may impose further constraints on use and/or distribution of the data/information, for example, inside the organization versus outside the organizations and/or with respect to physical boundaries to contain the data/information.

Data flow analysis is one way to tackle the information security risk as it may allow monitoring the flow of information throughout program execution and gather data related insights which can be useful in a variety of scenarios, specifically with respect to data misuse and/or distribution. Current data flow analyses are mostly based on statics analysis, for example, point-to analysis and reaching definition.

The high spread of dynamic, scripting and/or reflective languages present further challenges in computer science in general and in information security in particular. The dynamic languages, for example, JavaScript, Ruby and/or Perl may employ dynamic execution which is very different from previous programming languages. Program objects such as, for example, variables, arrays and/or functions may be dynamically constructed, converted, re-assigned and/or destroyed. The dynamic nature of the dynamic languages makes the data analysis and/or data tracking a challenging task.

SUMMARY

According to some embodiments of the present invention there are provided methods for dynamically analyzing a data flow of a dynamic language program to determine processes access rights to data items. The method is applied using one or more hardware processors for executing a dynamic language program where during the execution each of a plurality of data items is stored and/or contained in a data wrapper that further contains a metadata record indicative of one or more characteristics of a respective data item of the plurality of data items. The method further comprises receiving a request from a process of the dynamic language program to access one or more requested data items of the plurality of data items, determining whether the process is allowed to access the one or more requested data items according to an analysis of a classification of the process compared to the one or more characteristics indicated by the metadata record associated with each of the one or more requested data items and generating a response to the process according to the determination.

The determination is directed at preventing one or more unauthorized accesses to the one or more requested data items by an unauthorized process.

Optionally, a warning indication is issued to a monitoring process in an event the analysis identifies that the process is not allowed to access the one or more requested data items.

Optionally, a new data wrapper is crated for one or more new data items derived from one or more manipulated data item of the plurality of data items. The new data wrapper further contains a new metadata record derived from a respective metadata record of the one or more accessed data items in order to propagate the one or more characteristics from the one or more manipulated data items to the one or more new data items.

Optionally, one or more operation of the dynamic language operations are replaced with a respective alternative operation adapted to operate with the data wrapper. The one or more operations are members of a group consisting of: an operator and a function.

Optionally, the alternative operation is adapted to analyze whether a process executing the alternative operation is allowed to access one or more requested data items according to an analysis of a classification of the process compared to one or more characteristic indicated by a metadata record contained in the respective data wrapper.

Optionally, the alternative operation is created automatically by an automated refactoring tool.

The alternative operator is adapted to extract a respective data item from the data wrapper prior to using the data item.

The alternative function is adapted to extract a respective data item from the data wrapper prior to using said data item.

The alternative function is invoked from the data wrapper of the (original) function. The alternative function is adapted to extract one or more accessed data items from the data wrapper of the one or more accessed data items and invoke the (original) function with the one or more accessed data items which are used by the (original) function.

Optionally, one or more runtime state objects are created to store one or more recent data wrappers which are most recently accessed. The one or more runtime state objects provide a context to an invocation of the operation during said execution.

Optionally, the one or more runtime state objects are defined as global objects which are globally accessible by one or more entities of the dynamic language program. Each of the one or more runtime state objects is contained by a container object having an identifier not used in a scope of the dynamic language program to prevent the one or more entities from erroneously accessing the one or more runtime state objects as result of an identifier conflict.

Optionally, the data wrapper is identifiable as a data wrapper through a unique field included in the metadata record associated with the data wrapper.

Optionally, a respective data wrapper is crated for one or more sensitive data items of the plurality of data items while not creating a respective data wrapper for one or more other data items of the plurality of data items which are non-sensitive. The one or more sensitive data items are indicated by one or more users.

Optionally, the data wrapper includes a designation field to differentiate between said data wrapper and each of said plurality of data items.

According to some embodiments of the present invention there are provided systems for dynamically analyzing a data flow of a dynamic language program to determine processes access rights to data items. The system comprising a data store storing a plurality of data items, a program store storing a dynamic language code and at least one processor coupled to the data store and the program store for executing the stored dynamic language code. Each of the data items is contained in a respective data wrapper that further contains a metadata record indicative of one or more characteristics of a respective data item of the plurality of data items. The dynamic language code comprises:

Code instruction to receive, during an execution of a dynamic language program, a request from a process of the dynamic language program to access one or more requested data items of the plurality of data items.

Code instructions to determine whether the process is allowed to access the one or more requested data items according to an analysis of a classification of the process compared to the one or more characteristics indicated by a respective metadata record associated with each of the one or more requested data items.

Code instructions to generate a response to the process according to the determination.

According to some embodiments of the present invention there is provided a computer program product for dynamically analyzing a data flow of a dynamic language program to determine processes access rights to data items. The computer program product comprises:

First program instructions to receive, during an execution of a dynamic language program, a request from a process of the dynamic language program to access one or more requested data items of a plurality of data items. Each of the plurality of data items is stored and/or contained in a data wrapper that further contains a metadata record indicative of one or more characteristics of a respective data item of the plurality of data items.

Second program instructions to determine whether the process is allowed to access the one or more requested data items according to an analysis of a classification of the process compared to the one or more characteristics indicated by a respective metadata record associated with each of the one or more requested data item.

Third program instructions to generate a response to the process according to the determination.

Wherein the first, second and third program instructions are executed by one or more processors from the non-transitory computer readable storage medium.

According to some embodiments of the present invention there is provided a computer program product for automatically instrumenting a plurality of dynamic language operations to support dynamic data flow analysis of a dynamic language program. The computer program product comprises:

First program instructions to receive one or more operation of a dynamic language which operates over one or more of a plurality of data items.

Second program instructions to create an alternative operation to the one or more operations. The alternative operation is adapted to operate with one or more data wrappers each containing a respective data item of the plurality of data items and further contains a metadata record indicative of one or more characteristics of the respective data item.

Third program instructions to output the alternative operation.

Wherein the first, second and third program instructions are executed by one or more processors from the non-transitory computer readable storage medium.

Optionally, one or more operations of the dynamic language are replaced with respective alternative operations adapted to operate with the data wrapper. The one or more operations are members of a group consisting of: an operator and a function.

Optionally, the alternative operation is adapted to analyze whether a process executing the alternative operation is allowed to access one or more requested data items of the plurality of data items according to an analysis of a classification of the process compared to the one or more characteristics of each of the one or more requested data item.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
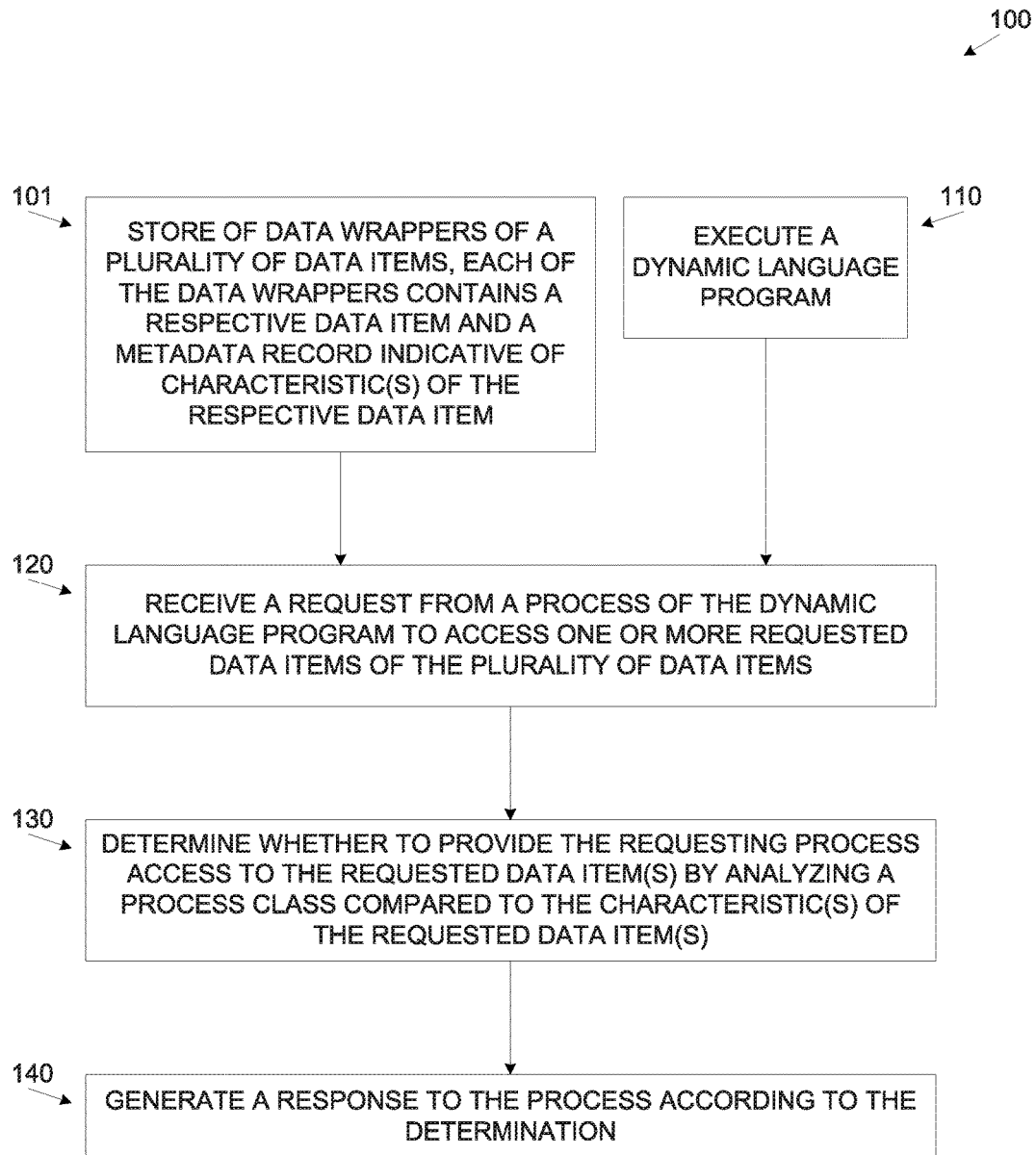
FIG. 1 is a flowchart of an exemplary process for dynamically analyzing a data flow of a dynamic language program to determine access rights to data items, according to some embodiments of the present invention.

The present invention, in some embodiments thereof, relates to dynamically analyzing a data flow of a dynamic language program to determine access rights to data items, and, more specifically, but not exclusively, to dynamically analyzing a data flow of a dynamic language program to determine access rights to data items to address data security aspects.

According to some embodiments of the present invention, there are provided systems and methods for dynamically analyzing data flow of dynamic language programs in particular JavaScript programs to determine access rights to data items and specifically in order to address data security concerns.

The dynamic data flow analysis is based on data wrappers which are created to include the input data items available from one or more sources, for example, a database, a list, a file and/or a document object module (DOM) object. The data wrapper further includes a metadata record assigned to a respective data item included in the data wrapper. The metadata record serves as a tag of the respective data item and indicates one or more characteristics of the data item, for example, an access privilege, an owner and the likes. During execution of a dynamic language program, for example, JavaScript, Ruby and/or Perl one or more processes may request to access one or more of the data items. The request is dynamically analyzed in runtime with respect to the requesting process and the characteristic(s) of the requested data item(s) and the request is determined to be allowable or not. Based on the determined result a response is generated to the requesting process to grant or deny access to the requested data item(s).

Dynamically analyzing the program data flow in runtime using the data wrappers may be essential to maintain track of the characteristic(s) of new data item(s) which may be derived from the input data item(s) during the program execution. New data wrapper may be created for new data item(s) created at runtime from the input data item(s). The new data wrapper and specifically a new metadata record may be derived from the (original) metadata record contained in the (original) data wrapper of the respective input data item. Creating the new data wrapper with the new metadata record may verify that the characteristic(s) of the original input data item are propagated to the new data items to allow proper data flow analysis.

The dynamic data flow analysis may provide enhanced control over the data and/or information transfer and/or use during execution of the dynamic language program, specifically in order to prevent misuse and/or distribution of the input and/or new data item(s). Moreover with $3^{rd}$ party dynamic languages programs becoming frequently used in organizational information systems and/or platforms, the dynamic data flow analysis may proof to be imperative for preventing data and/or information leaks from the organization information systems.

The dynamic data flow analysis may overcome drawback which are inherent in current data flow analysis methods, for example, point-to analysis and reaching definition which are static in nature and may therefore not be adequate for the dynamic language programs which may change and/or create new data time(s) during execution with no traceability to the input data item(s) from they were created.

Each of the plurality of input data items is contained in an associated respective data wrapper which further contains a metadata record which presents the characteristic(s) of the associated data item. The characteristic(s) may include, for example, access privileges, data item ownership, storage location, sensitivity level and the likes. The input data items may be available from one or more sources.

Constructing the data wrappers to contain both the respective data item and the corresponding metadata record may prove to provide several benefits as opposed to string the data item separately from its corresponding metadata record. The metadata record may be readily available for operations over the respective data item thus performance may not be hindered. In addition identifiers to correlate between each of the data items and its respective metadata record are not required thus reducing complexity of the program code.

Optionally, one or more users may indicate which data item(s) need to be associated with the data wrappers. The selective implementation of the data wrappers may reduce complexity and/or execution overhead by restricting the use of data wrappers for sensitive data item(s) while avoiding using data wrappers for the rest of the non-sensitive data items.

Optionally, each of the data wrappers includes a designation field which identifies it as a data wrapper as opposed to each of the plurality of data items.

During execution of the dynamic language program new data items may be created by, for example, altering, manipulating, transforming, re-assigning and/or renaming input data item(s). In order to maintain traceability of the characteristic(s) of the input data item for the new data item the new data wrapper is created to contain the new data item and a new metadata record which may be derived from the metadata record of the input data item(s). Assigning the new metadata record to the new data item ensures that characteristic(s) of the original input data item(s) are applied to the new data item(s). The process of creating new data item(s) may be repeated multiple times, i.e. the new data item(s) may be created from the input data item(s) and/or form new data item(s) previously created. Therefore, for any new data item the characteristics of the input data item from which the new data item is derived are maintained for the new data items through the metadata record included in the respective data wrapper.

During the execution of the program, one or more processes may request to access one or more of the data items which may be input data item(s) and/or new data item(s). The request is dynamically analyzed in runtime according to a class and/or classification of the requesting process indicating one or more process characteristics, for example, privileges of the requesting process compared to the characteristic(s) of the requested data item(s). Based on the analysis the requesting process is granted access the requested data item(s) in case the requesting process characteristic(s) comply with the characteristic(s) of the requested data item(s). On the other hand the requesting process is denied access to the requested data item(s) in the event the process characteristic(s) of the requesting process do not comply with the characteristic(s) of the requested data item(s).

Optionally, a warning indication is issued in case the analysis determines that the requesting process is requests to access one or more requested data items which are beyond the access privileges of the requesting process.

In order to facilitate the use of the data wrappers the dynamic language environment and/or the dynamic language program may need to be instrumented to adapt to operating with the data wrappers. The instrumentation may include, for example, using alternative operations, storing run time state objects and/or providing invocation context. The alternative operations may include, for example, operators and/or library functions. Since the data item(s) are contained within the respective data wrappers, the original operators and/or library functions may need to be altered to be able to access the respective data wrapper, extract the data item and make use of it. To support execution of the alternative library function(s) the context of the execution may be required to maintain a proper execution path and/or provide context to the invoked function(s). To provide the environment context the run time state objects may hold the most recent accessed data wrappers and/or data items to provide the invoked function(s) to appropriate context in which it operates.

Optionally, the instrumentation is done using an automated tool following a set of rules indicated by one or more users.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a flowchart of an exemplary process for dynamically analyzing a data flow of a dynamic language program to determine access rights to data items, according to some embodiments of the present invention. A dynamic data flow analysis process 100 may allow enhanced control over data and/or information distribution, transfer and/or use by multiple processes during execution of a dynamic language program. The data flow analysis process 100 may be direct to, for example, preventing misuse and/or distribution of the data/information. Moreover, the processes may part of be $3^{rd}$ party dynamic languages programs over which there may be little control while they may be hostile and/or susceptible to hacking and. Monitoring data/information access by such process may therefore prove to be critical to ensure data/information security. Furthermore, the dynamic data flow analysis process 100 is adapted for the dynamic languages, for example, JavaScript, Ruby and/or Perl for which static data flow analysis may not be sufficient, complete and/or efficient. The dynamic data flow analysis process 100 is performed during runtime execution of one or more programs in the dynamic languages execution environment after instrumenting one or more aspects of the dynamic languages environment during the program(s) design, compilation and/or build as is discussed herein below.

Figure 2:
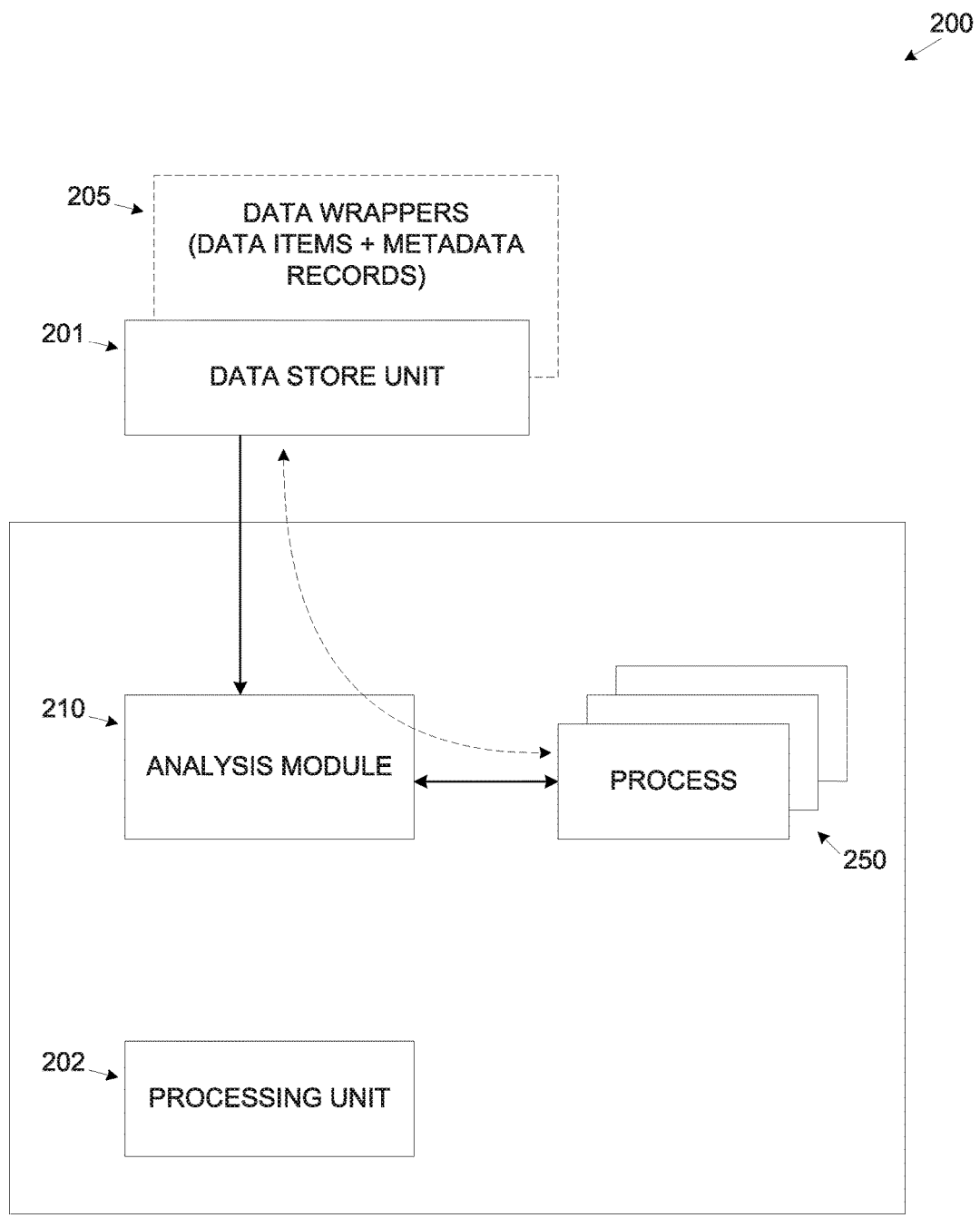
FIG. 2 is a schematic illustration of an exemplary system for dynamically analyzing a data flow of a dynamic language program to determine access rights to data items, according to some embodiments of the present invention.

Reference is also made to FIG. 2 which is a schematic illustration of an exemplary system for dynamically analyzing a data flow of a dynamic language program to determine access rights to data items, according to some embodiments of the present invention. A data flow analysis system 200 executing a process such as the process 100 includes a data store unit 201 which stores a plurality of data items each contained in a respective one of a plurality of data wrappers 205, an analysis module 210 which analyzes access request from one or more process 250 of a dynamic language program and a processing unit 202, for example, a computer, a server and/or a processing node and/or a processing cluster comprising one or more processors and/or one or more cores of one or more processors coupled with one or more memory devices for executing the dynamic language program. Wherein a module and/or a process refers to a plurality of program instructions stored in a non-transitory medium and executed by one or more processors such as the processing unit 202. The data store 201 may include one or more data structures, for example, a database, a list and/or a DOM which as stored in one or more storage devices, for example, a non-transitory storage medium, a local processing unit, a remote processing unit and/or a distributed processing unit such as, for example, a cloud and/or a server ensemble.

Reference is now made once again to FIG. 1. As shown at 101, the process 100 for dynamically analyzing a data flow of a dynamic language program is based on a plurality of data wrappers such as the data wrappers 205 are stored in a data store such as the data store 201. Each of the data wrappers 205 contains a respective input data item and a metadata record indicating one or more characteristics of the respective input data item, for example, access privileges, ownership, storage location, sensitivity level and the likes. The metadata record may include additional characteristic(s), for example, size, data of creation, date of latest change and the likes which may be used for data flow analysis as well as other one or more purposes, for example, storage strategy.

Storing the data items in their respective data wrappers 205 together with the respective metadata record presents some advantages compared to storing the data item separated from the respective metadata record. First, it makes the metadata readily available to operations, which may contribute to increasing performance. In addition the need to generate unique identifiers for associating the multitude of data items (both values and literals) with the respective metadata records throughout the program code may be avoided thus reducing complexity of the program code.

The input data items are designated as input to identify them as data items retrieved from the data store 201 to distinguish the input data items from new data items which are created during runtime execution of one or more dynamic language programs. However during execution new data wrappers 205 may be created for new data items. The new data item(s) may be derived from one or more source data items which may be the input data item(s) and/or new data item(s) previously created. The derivation may be in the form of, for example, alteration, manipulation, re-assignment and/or re-name. The new data wrapper 205 includes the newly created data item and a respective metadata record which may be derived from the metadata record of the source data item. The new metadata record may indicate for the new data item the characteristic(s) propagated and/or inherited from the source data item.

Optionally, each of the data wrappers 205 includes a designation field to identify it as a data wrapper 205 and differentiate it from the plurality of data items.

Optionally, not all the input data items are contained in respective data wrappers 205. One or more users may indicate sensitive input data item(s) that are associated with the data wrappers 205 while the rest of the non-sensitive data items are left in their original form with no data wrappers 205 in order to reduce complexity and/or execution overhead involved with processing the data wrappers 205.

As shown at 110, the process 100 starts with execution of the dynamic language program(s). The dynamic languages may include one or more languages, for example, JavaScript, Ruby and/or Perl.

As shown at 120, a process such as the process 250 of the dynamic language programs requests access to one or more requested data items of the data items contained in respective data wrappers 205. The request is received by an analysis module such as the analysis module 210. The analysis module 210 may be implemented in one or more forms, for example, an entity and/or a process within the dynamic language execution environment. Optionally, the analysis module 210 is a distributed implementation in which one or more of the dynamic language operations, for example, operator, function and/or library function are instrumented to include a code segment which utilizes the analysis module 210 for the respective operation.

As shown at 130, based on a class and/or classification of the process 250 compared to the characteristic(s) of the requested data item the analysis module 210 determines whether to grant or deny access of the process 250 to the requested data item. The classification of the process 250 may include one or more process characteristics, for example, an access right, a privilege level, and/or a scope reachability of the process 250. The process 250 classification may indicate, for example, the process 250 has access rights to all the data items, part of the data items and/or none of the data items. For example, if the process 250 classification indicates high access privileges (rights) the analysis module 210 may determine to grant the process 250 access to the requested data item even if the requested data item is sensitive and/or restricted as indicated by the respective metadata record. On the other hand, the analysis module 210 may determine to deny accesses to the same requested data item from a process 250 which has limited access privileges. This may be analogous to two exemplary processes 250, one manipulating data locally within premises of an organization and having high access privileges while another process 250 may be distributing data to location off-site and is assigned limited access privileges.

As shown at 140, based on the analysis result of the analysis module 210 a response is issued to the requesting process 250 to grant or deny access to the requested data item(s).

Optionally, the analysis module 210 issues a warning indication at the detection of a process 250 which tries to access one or more requested data items which are beyond the access privileges of the process 250. Such an access may indicate a possible information breach and/or attempt of an unauthorized process 250 to access sensitive data/information. The warning indication may be issued by the analysis module 210 to a monitoring module and/or entity within the dynamic language execution environment which may take further action to handle the suspected information breach and/or unauthorized access attempt.

Applying the process 100 requires using the data wrappers 205 for at least some of the data items and may require some instrumentation, alteration and/or modification to code of the dynamic language environment, platform, libraries and/or programs. The instrumentation, alteration, and/or modification of the code may be required to adapt the dynamic language environment, platform, libraries and/or programs to operate with the data wrappers 205 rather than with the data items. The instrumented dynamic language environment, platform, libraries and/or programs need to extract the requested data item(s) from their respective data wrapper(s) 205 prior to using the requested data item(s). The instrumented dynamic language environment, platform, libraries and/or programs may be further adapted to create new data wrappers for new data items derived from the requested data items at runtime of the dynamic languages program(s). The instrumentation, alteration, and/or modification of the code may be done during the program design, compilation and/or build processes and may be performed by one or more users using a development platform, for example, an integrated development environment (IDE) presenting a graphical user interface (GUI) and the likes.

Optionally, an automated tool is provided for refactoring the code of the instrumentation, alteration, and/or modification of the dynamic language environment, platform, libraries and/or programs. The automated tool may follow pre-defined rules and/or framework to apply the modifications to the code as described hereinafter.

Optionally the instrumentation, alteration, and/or modification of the code includes inserting an analysis code segment to integrate data flow analysis capabilities into one or more objects and/or entities of the dynamic language, for example, operators, functions and/or library functions. The analysis code segment may be part of a distributed data flow analysis module such as the analysis module 210 which is distributed among one or more of the objects, entities, operators and/or functions of the dynamic language. Each analysis code segment may implement the data flow analysis process 100 for the respective object and/or entity.

A first aspect that may require instrumentation, alteration and/or modification are the dynamic language operators such as, for example, arithmetic operators, logical operators and/or assignment operators may need to be replaced with alternative operators which are re-designed, adapted and/or configured to operate with the data wrappers 205 rather than with the data items themselves. In a dynamic language, a data item (object) field access expression may be constructed at runtime. Specifically, a name of a field of a requested data item may be determined at runtime, for example, by constructing a string that represents the field name. For example, in JavaScript, a field q in data item p may be accessed by an expressions p.q and p['q']. In the latter expression, 'q' is a string. Consequently, in order to intercept field accesses, all field access operators need to be replaced with alternative operators that extract the field value from the data wrapper 205 of the contained data item. For instance, the p.q and p['q'] expressions are replaced by a getField(p,'q') expression, where the getField( ) function fetches the field named 'q' of the value part of the data wrapper p. Accesses to array elements are handled similarly.

A second aspect that may require instrumentation, alteration and/or modification is the need to support and/or provide a context to context-based function execution. In certain dynamic functional languages, a function may be invoked in a particular context, which is accessible from within the function. For example, in JavaScript, if an object p has a field foo of type function, then foo can be invoked as p.foo( ), which makes p act as foo's context. Following, inside foo's code p is accessible via this keyword. This language feature may pose an issue, because, in the instrumented code, both p and foo are data wrappers such as the data wrappers 205. Therefore, in practice, foo is invoked as p.value.foo.value( ), which causes foo's data wrapper 205 (p.value.foo), to be foo's context, instead of p. Due to the dynamic nature of field accesses, it may be impossible to address this issue directly by instrumentation, for example, by re-writing the invocation of p.foo( ). Instead, in order to overcome this issue during runtime execution, a runtime state object which contains the two most recently accessed data wrappers 205 may be stored and/or held. The runtime state object may allow obtaining a reference to p whenever an invocation of p.foo( ) is encountered which is instrumented into p.value.foo.value( ). Thus, at runtime, upon invocation of foo( ) a reference to p is obtained and then foo( ) is executed with p acting as an invocation context.

A third aspect that may require instrumentation, alteration and/or modification is the need to prevent process such as the process 250 access to a global runtime state. As discussed above a runtime state object is created and stored to support the context-based invocations. An analysis module such as the analysis module 210 performing the data flow analysis may require access the runtime state object. This implies that the runtime state object may need to be instrumented as a global object, for example, a variable. However, once created as a global object, the runtime state object may be erroneously (accidentally) accessed by one or more processes 250 and/or one or more other entities within the dynamic language program due to naming and/or identifier conflicts and/or collisions. To prevent such a scenario the runtime state object which is defined as a global object is identified, named and/or referenced with an identifier, name and/or reference which are not already defined in the scope of the dynamic language program scope. Achieving this may require a pass over the entire code of the dynamic language program.

A fourth aspect that may require instrumentation, alteration and/or modification is the need create alternative functions to one or more standard functions, for example, a standard library function, i.e. shadowing the standard function(s). In order for the analysis module 210 to monitor the data flow through invocations of one or more standard library functions, the alternative functions for the standard library function(s) are created. The alternative functions perform the following:

Extract a requested input data item from the respective data wrappers 205.

Invoke the (original) standard function.

Put the returned new data item (value) of the invocation into a data wrapper 205.

Construct a new metadata record for the new data item in the new data wrapper 205 based on the metadata of the function input data item(s). In case a context for the invocation is present it is also included in the new data wrapper 205.

Return the new data wrapper 205.

In some scenarios of the data flow analysis, the new metadata record created for the return new data item (value) from the standard library function may depend on logic and/or operations performed by the original function. For such scenarios, each standard function may need to fully inspected in order to determine the specifics of the characteristic(s) propagation from the input data item to the new data item as reflected in the new metadata record. However, this may not present an issue since most dynamic languages targeted by the data flow analysis presented in the present invention include relatively small standard libraries. Moreover, it may often prove to be simple to partition the standard library functions into well-defined groups, according to the required metadata records propagation and more accurately according to the characteristic(s) propagation scheme from the input data item(s) to the new data item(S). Such partitioning may allow for automated instrumentation process to follow the initial manual classification as identified in the metadata record(s) of the input data item(s).

After the alternative function(s) are created, it is essential to assure that the alternative function(s) are invoked instead of the (original) standard function(s). This may present a further challenge since a name of the standard function may be stored in a data item, for example, a variable and/or an object field, resulting in situations where invocations of the function(s) may not be identified (and subsequently replaced) by the name of the function. On the other hand, the (original) standard function(s) may not be simply replaced with the alternative function(s) because the original) standard function(s) still need to be invoked from within the respective alternative function(s). In order to resolve this issue each alternative function is stored in a data wrapper 205 of the respective (original) standard function and the function invocation (in the program code) is replaced with code instructions that first extract the alternative function from the data wrapper 205 of the (original) standard function and then invokes the alternative function.

Some embodiments of the present disclosure are provided through examples. However, this invention may be embodied in many different forms and should not be construed as limited to any specific structure or function presented herein. As discussed before the dynamic data flow analysis 100 may be directed towards data and/or information security. An exemplary embodiment may be an information system of an organization which is based on a dynamic language. The data and/or information handled through the information system may include high sensitivity data items, and low sensitivity data item. The high sensitivity data items may include, for example, personal identification number, social security number, credit card details, banking account details and the likes. Distribution of the high sensitivity data items may be restricted for use by specific one or more trusted process such as the process 250 which are, for example, trusted and/or operate within a pre-defined, contained virtual and/or physical premise. The restrictions may be imposed by the organization regulations and/or by a governmental regulation policy. A dynamic data flow analysis such as the process 100 may be applied to the execution environment of the organizational information system to monitor and analyze the data flow throughout the information system. The process 100 may allow control over the data/information flow in order to, for example, grant the trusted process(s) 250 access to the sensitive data item(s) and/or prevent unauthorized process(s) 250 from accessing the high sensitivity data item(s). The process 100 may further issue a warning indication to, for example, a security module of the information system in the event an unauthorized access attempt is made by one ore processes 250 which may be hostile so that further action may be taken to identify, block and/or track the suspected hostile process(s) 250.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of dynamically analyzing a data flow of a dynamic language program to determine processes access rights to data items, comprising:
   using at least one hardware processor for performing the following:
   receiving a dynamic language program;
   upon identification of at least one operation in said dynamic language program as an operator designed to operate on data items, replacing said at least one operation with a respective alternative operator, designed to operate on data items contained in data wrappers, said respective alternative operator is designed to extract said data item from its data wrapper before operating on said extracted data item;
   upon identification of said at least one operation as a function, replacing said function with an alternative function, said alternative function is stored in a respective data wrapper of said function and invoked from said respective data wrapper of said function, said alternative function is designed to extract at least one accessed data item from said data wrapper of said at least one accessed data item and invoke said function with said at least one accessed data item which is used by said function;
   wherein each of said data wrappers further contains a metadata record indicative of at least one characteristic of a respective data item contained in said each of said data wrappers;
   executing said dynamic language program;
   receiving, during execution of said dynamic language program, a request from a process of said dynamic language program to access at least one requested data item of a plurality of data items to perform said at least one operation on said at least one requested data item;
   determining whether said process is allowed to access said at least one requested data item according to a comparison between a classification of said process and said at least one characteristic indicated by said metadata record associated with said at least one requested data item; and
   generating a response to said process according to said determination.

2. The computer implemented method of claim 1, wherein said determination is directed at preventing at least one unauthorized accesses to said at least one requested data item by an unauthorized said process.

3. The computer implemented method of claim 1, further comprising issuing a warning indication to a monitoring process in an event said analysis identifies said process is not allowed to access said at least one requested data item.

4. The computer implemented method of claim 1, further comprising creating a new data wrapper for at least one new data item derived from at least one manipulated data item of said plurality of data items, said new data wrapper further contains a new metadata record derived from a respective metadata record of said at least one accessed data item in order to propagate said at least one characteristic from said at least one manipulated data item to said at least one new data item.

5. The computer implemented method of claim 1, further comprising said alternative operation is adapted to analyze whether a process executing said alternative operation is allowed to access at least one requested data item according to a comparison between a classification of said process compared and at least one characteristic indicated by a metadata record contained in a respective said data wrapper.

6. The computer implemented method of claim 1, wherein said alternative operator and said alternative function are created automatically by an automated refactoring tool.

7. The computer implemented method of claim 1, wherein said operator is replaced with a respective alternative operator adapted to operate with said data wrapper, said alternative operator is adapted to extract a respective data item from said data wrapper prior to using said data item.

8. The computer implemented method of claim 1, further comprising creating at least one runtime state object which stores at least one recent data wrapper which is most recently accessed, said at least one runtime state object provides a context to an invocation of said at least one operation during said execution.

9. The computer implemented method of claim 8, further comprising said at least one runtime state object is defined as global object which is globally accessible by at least one entity of said dynamic language program, said at least one runtime state object is contained by a container object having an identifier not used in a scope of said dynamic language program to prevent said at least one entity from erroneously accessing said at least one runtime state object as result of an identifier conflict.

10. The computer implemented method of claim 1, further comprising creating a respective said data wrapper for at least one sensitive data item of said plurality of data items while not creating a respective said data wrapper for at least one other data item of said plurality of data items which is non-sensitive, said at least one sensitive data item is indicated by at least one user.

11. The computer implemented method of claim 1, further comprising said data wrapper includes a designation field to differentiate between said data wrapper and each of said plurality of data items.

12. A system for dynamically analyzing a data flow of a dynamic language program to determine processes access rights to data items, comprising:

a data store storing a plurality of data items each contained in a data wrapper that further contains a metadata record indicative of at least one characteristic of a respective data item contained in said data wrapper;

a program store storing a dynamic language code;

at least one processor coupled to said data store and said program store for executing said stored dynamic language code, said at least one processor executing a code comprising:

code instructions for identifying at least one operation, in said dynamic language code, designed to operate on data items, code instructions for replacing said at least one operation, when identified as an operator, with a respective alternative operator, designed to operate on data items contained in data wrappers, said respective alternative operator is designed to extract said data item from its data wrapper before operating on said extracted data item, code instructions for replacing said at least one operation, when identified as a function, with a respective alternative function, said alternative function is stored in a respective data wrapper of said function and is invoked from said respective data wrapper of said function, said alternative function is designed to extract at least one accessed data item from said data wrapper of said at least one accessed data item and invoke said function with said at least one accessed data item which is used by said function, wherein each of said data wrappers further contain a metadata record indicative of at least one characteristic of a respective data item contained in said each of said data wrappers;

said dynamic language code comprising:

code instruction to receive, during an execution of a dynamic language program, a request from a process of said dynamic language program to access at least one requested data item of said plurality of data items;

code instructions to determine whether said process is allowed to access said at least one requested data item according to a comparison between a classification of said process and said at least one characteristic indicated by a respective said metadata record associated with said at least one requested data item; and code instructions to generate a response to said process according to said determination.

13. A computer program product for automatically instrumenting a plurality of dynamic language operations to support dynamic data flow analysis of a dynamic language program, comprising:

a non-transitory computer readable storage medium;

first program instructions to receive at least one operation of a dynamic language which operates over at least one of a plurality of data items;

second program instructions to create, upon identification of said at least one operation as an operator, an alternative operator to said operator, said alternative operator is adapted to operate with at least one data wrapper which contains a respective data item of said plurality of data items, said alternative operator is designed to extract said respective data item from its data wrapper before operating on said extracted data item, wherein said at least one data wrapper further contains a metadata record indicative of at least one characteristic of said respective data item;

third program instructions to create, upon identification of said at least one operation as a function, an alternative function, said alternative function is stored in a respective data wrapper of said function and is invoked from said respective data wrapper of said function, said alternative function is designed to extract at least one accessed data item from said data wrapper of said at least one accessed data item and invoke said function with said at least one accessed data item which is used by said function; and fourth program instructions to output said alternative operator and said alternative function;

wherein said alternative operator and said alternative function are further adapted to create at runtime, at least one new data wrapper for at least one new data item, said at least one new data item is derived by manipulating one of said plurality of data items, said new data wrapper further contains a new metadata record derived from a respective metadata record of said one of said plurality of data items in order to propagate said at least one characteristic from said at least one of said plurality of data items to said at least one new data item; and wherein said first, second, third and fourth program instructions are executed by at least one processor from said non-transitory computer readable storage medium.

14. The computer program product of claim 13, further comprising at least one of said operator and said function which is replaced with respective said alternative operator or respective said alternative function, is indicated by a user.

15. The computer program product of claim 13, further comprising said alternative operator and said alternative function are adapted to analyze whether a process executing said alternative operator or said alternative function is allowed to access at least one requested data item of said plurality of data items according to a comparison between a classification of said process and said at least one characteristic of said at least one requested data item.

\* \* \* \* \*